United States Patent Office 2,829,159
Patented Apr. 1, 1958

2,829,159
CONVERSION OF PYROGLUTAMIC ACID TO GLUTAMIC ACID

Norman L. Hause, Grand Island, N. Y., assignor to E. I. du Pont de Nemours and Company, Wilmington, Del., a corporation of Delaware No Drawing. Application March 19, 1956
Serial No. 572,218

6 Claims. (Cl. 260—534)

This invention relates to a method for converting pyroglutamic acid to glutamic acid.

Optically active glutamic acid, e. g. L-glutamic acid, is an effective agent for resolving DL-lysine. In such a resolution, L-glutamic acid reacts with DL-lysine to produce a mixture of L-lysine L-glutamate and D-lysine L-glutamate which are separated by fractional crystallization from a suitable solvent. In practical applications of such a resolution, it is necessary for reasons of economy to recover the glutamic acid component from both lysine glutamate fractions in order that the glutamic acid can be recycled in the process. Recovery can be effectively accomplished in the form of a dilute solution of ammonium glutamate, which after being concentrated by evaporation, is reused. However, repeated recycling of the glutamic acid in such a system results in a gradual conversion of the glutamic acid resolving agent to the corresponding optically active pyroglutamic acid. Since the latter is not effective for resolving lysine, a practical method for reconverting it to glutamic acid would be highly advantageous.

The ordinary water-soluble, strong mineral acids and bases have been used for converting pyroglutamic acid to glutamic acid (Foreman, Biochem. J. 8, 481–493 (1914)). However, in using these agents, it is necessary to neutralize the reaction mixture after completion of the reaction, and to crystallize the glutamic acid to isolate it. Complete recovery by crystallization in the presence of neutral salts is difficult.

It is an object of the invention to provide an improved method for converting pyroglutamic acid to glutamic acid. A further object is to provide a method whereby such conversion is readily accomplished and the glutamic acid product is immediately separated from the reaction solution in a condition suitable for reuse in resolving lysine without having to resort to troublesome crystallization methods. Further objects will be apparent from the following description.

The objects of the invention are accomplished by heating an aqueous solution of pyroglutamic acid with a strongly acidic cation-exchange material in its acid form until the desired conversion is effected, then separating from the solution the cation-exchange material with the glutamic acid product adsorbed thereon. The glutamic acid can then be eluted from the cation-exchange material and reused or recovered in any desired manner.

It has been found that the strongly acidic cation-exchange materials, when employed in their acid form, are highly effective for the present purpose despite the fact that they are substantially completely insoluble in pyroglutamic acid solutions. It is a characteristic advantage resulting from their use that the product glutamic acid is adsorbed as formed by the cation-exchange material, whereas any unchanged pyroglutamic acid is not adsorbed. This selective adsorption of the glutamic acid product permits recovery thereof from the reaction mixture simply by removing the cation-exchange material with its adsorbed glutamic acid from the reaction mixture, and eluting the glutamic acid from the exchange material, e. g. with aqueous ammonia. Preferably, dilute aqueous ammonia, e. g. about 0.5 to 5% strength, will be used for this purpose but more concentrated solutions can be used.

A wide variety of strongly acidic cation-exchange materials are known and many are available commercially, any of which can be used for the present purpose. Illustrative of these are the sulfonated coals and the synthetic cation-exchange resins containing active sulfonic ($-SO_3H$), phosphonic ($-PO_3H_2$) or phosphonous ($-PO_2H_2$) groups. Resins of the sulfonic acid type such as the sulfonated phenol-aldehyde resins and particularly the sulfonated copolymers of styrene and divinylbenzene, are preferred.

In carrying out the present invention, an aqueous solution of the pyroglutamic acid will generally be contacted with the cation-exchange resin at a temperature from about 60 to about 140° C. for a time sufficient to effect the desired conversion. Complete conversion may be effected, or contact between the resin and the solution can be terminated when only partial conversion has been realized. Generally, a conversion of at least 50% will be desirable before terminating such contact although lower conversions may be practical in some instances. Conversion to glutamic acid at temperatures substantially below about 60° C. is relatively slow. While the rate of conversion generally increases as the temperature is increased, temperatures above about 140° C. are preferably avoided since at such higher temperatures there is some danger of racemizing the pyroglutamic and glutamic acids. The preferred temperatures range from 80 to 120° C., at which temperatures contact of the solution with the resin for a time ranging from 1 to 10 hours is generally satisfactory.

The concentration of pyroglutamic acid in the solution to be treated is not critical and can be varied widely, e. g. over a range of from 0.5 to about 60%, based upon the weight of the solution. Concentrations of at least 5% are preferred in order to avoid handling excessively large volumes of solution. The preferred concentrations range from 5 to 30%. The concentrations may range up to the solubility limit under the temperature conditions used, but because of the increased viscosity of solutions above about 30% strength, such higher concentrations are not preferred. Solutions of soluble salts of pyroglutamic acid, such as the sodium, ammonium, potassium and lysine salts, can also be used. However, in such case, the cation-exchange resin (in acid form) should be employed in an amount sufficient to adsorb all cations as well as the glutamic acid conversion product.

As indicated above, an amount of the cation-exchange resin sufficient to adsorb the glutamic acid product (and other cations, if any, are present) should be used. Larger amounts can and most generally will be used in order to reduce the time required for the desired conversion.

In one embodiment of the invention, a slurry of the pyroglutamic acid and the cation-exchange resin is agitated, e. g. by stirring, at a suitable temperature until the desired conversion is effected. The resin with its adsorbed glutamic acid is separated from the solution, washed, and the glutamic acid is eluted from the resin with aqueous ammonia to obtain an ammonium glutamate solution.

In a preferred embodiment of the invention, the pyroglutamic acid solution is repeatedly passed through a tower of the cation-exchange resin maintained at a suitable temperature. When the desired conversion is accomplished, the resin tower is washed and the adsorbed glutamic acid is recovered from the resin by elution with aqueous ammonia. The resulting ammonium glutamate solution can be used directly for resolving lysine, or it can be evaporated to recover the ammonium glutamate. If desired, the solution can be freed of excess ammonia by boiling, and the glutamic acid can then be recovered as the free acid by crystallization after the pH of the solution is adjusted to about 3 by the addition of a strong acid such as hydrochloric or sulfuric acid.

The invention is illustrated by the following example.

*Example*

A solution of 80 g. of pyroglutamic acid in 1520 ml. of water was pumped at a rate of about 30 ml. per minute (downflow) through a tower of a commercial cation-exchange resin (acid form) which was a sulfonated copolymer of styrene and divinylbenzene. The tower initially contained a water-covered bed of 750 ml. of the resin, 232 cm. high and 2.15 cm. in diameter. The tower was jacketed and was maintained at 90 to 95° C. by circulating hot water through the jacket.

The initial effluent from the tower was discarded until its pH changed from about 6 to about 4, after which the effluent was added to the feed solution and repeatedly recycled through the tower for a period of about 6 hours. Pumping was then stopped and the tower was cooled to room temperature and washed with water. The wash effluent and the feed solution after the recycling operation were analyzed and found to contain 28 g. of pyroglutamic acid.

A total of 4500 ml. of 1% aqueous ammonia was then passed through the resin tower at 80° C. The effluent contained 59 g. of glutamic acid, equivalent to 52 g. of pyroglutamic acid. This represents about a 65% conversion of the pyroglutamic acid used. Substantially complete conversion can be effected by prolonging the contact of the pyroglutamic acid solution with the resin.

The present invention provides a highly practical way for converting pyroglutamic acid to glutamic acid and for recovering the latter. It is characteristic of the method that the glutamic acid is removed from the solution as it is formed, by adsorption on the cation-exchange resin from which it can readily be recovered free of pyroglutamic acid.

I claim:

1. The method of converting pyroglutamic acid to glutamic acid comprising heating an aqueous solution of pyroglutamic acid with a strongly acidic cation-exchange material in its acid form and separating from the resulting mixture said cation-exchange material with glutamic acid adsorbed thereon.

2. The method of converting pyroglutamic acid to glutamic acid comprising heating an aqueous solution of pyroglutamic acid with a strongly acidic cation-exchange resin in its acid form at a temperature in the range 60 to 140° C., separating from the resulting mixture the cation-exchange resin with glutamic acid adsorbed thereon, and recovering said adsorbed glutamic acid from said resin.

3. The method of claim 2 wherein the temperature is in the range 80 to 120° C.

4. The method of claim 2 wherein the adsorbed glutamic acid is recovered from the resin by elution with aqueous ammonia.

5. The method of converting pyroglutamic acid to glutamic acid comprising heating a slurry of a sulfonic acid type cation-exchange resin in its acid form in an aqueous solution of pyroglutamic acid to a temperature in the range of 60 to 140° C., separating said resin with glutamic acid adsorbed thereon from the resulting solution, and recovering the adsorbed glutamic acid from said resin.

6. The method of converting pyroglutamic acid to glutamic acid comprising recycling an aqueous solution of pyroglutamic acid through a column of a sulfonic acid type cation-exchange resin in its acid form at a temperature in the range 60 to 140° C. until the desired conversion to glutamic acid is realized, removing said solution from the resin column leaving the glutamic acid product adsorbed on said column, and eluting said adsorbed glutamic acid from said column.

References Cited in the file of this patent

UNITED STATES PATENTS 2,528,047   Fitch ------------------ Oct. 31, 1950

OTHER REFERENCES

Takayama: Chem. Abs., vol. 27 (1933), p. 4177.

Wilson et al.: J. Biol. Chem., vol. 119 (1937), pp. 309–331 (page 313 relied on).

Greenberg: Amino Acids and Proteins (1951), p. 77.